United States Patent
Takala

(10) Patent No.: US 6,622,021 B1
(45) Date of Patent: Sep. 16, 2003

(54) SYSTEM AND METHOD FOR IMPLEMENTING AN AUTOMATED COMMUNICATION RESPONSE SERVICE

(75) Inventor: Anu Takala, Helsinki (FI)

(73) Assignee: Sonera Oyj, Helsinki (FI)

( * ) Notice: Subject to any disclaimer, the term of this patent is extended or adjusted under 35 U.S.C. 154(b) by 471 days.

(21) Appl. No.: 09/677,503

(22) Filed: Oct. 2, 2000

(30) Foreign Application Priority Data

Mar. 30, 1998 (FI) .................................................. 980718
Mar. 18, 1999 (FI) ................................... PCT/FI99/00213

(51) Int. Cl.⁷ ................................................ H04Q 7/20
(52) U.S. Cl. ....................... 455/466; 455/412; 455/414; 379/201.01
(58) Field of Search .................................. 455/412, 413, 455/414, 466, 517; 379/88.19, 88.2, 88.21, 201.1, 201.02, 201.06, 201.07, 207.12

(56) References Cited

U.S. PATENT DOCUMENTS

| | | | |
|---|---|---|---|
| 5,276,731 A | | 1/1994 | Arbel et al. |
| 5,351,235 A | * | 9/1994 | Lahtinen ...................... 370/259 |
| 5,434,908 A | | 7/1995 | Klein |
| 5,457,732 A | * | 10/1995 | Goldberg .................... 340/7.23 |
| 5,555,291 A | * | 9/1996 | Inniss et al. ............... 379/88.13 |
| 6,094,475 A | * | 7/2000 | Kang ........................... 379/84 |
| 6,347,225 B1 | * | 2/2002 | Nishiyama ................... 455/412 |

FOREIGN PATENT DOCUMENTS

| | | |
|---|---|---|
| EP | 0 484 067 A2 | 5/1992 |
| EP | 0 608 654 A1 | 8/1994 |
| EP | 0 611 239 A1 | 8/1994 |
| EP | 0 621 715 A1 | 10/1994 |
| EP | 0 783 219 A2 | 7/1997 |
| JP | 8111712 | 4/1996 |
| JP | 10304050 | 11/1998 |
| WO | WO 97/20423 | 6/1997 |
| WO | WO 97/47120 | 12/1997 |
| WO | WO 98/21870 | 5/1998 |

* cited by examiner

*Primary Examiner*—Edward F. Urban
*Assistant Examiner*—Simon Nguyen
(74) *Attorney, Agent, or Firm*—Cohen, Pontani, Lieberman & Pavane

(57) ABSTRACT

A system and method for implementing an automated response functionality in a telecommunication network that includes a short-message service center (SMSC) for receiving, storing and sending a short message, an electronic mail service base for receiving, storing and sending an electronic mail message, a mobile services switching center (MSC), and data terminal equipment (DTE). When the intended recipient B-subscriber cannot be reached, an answering server automatically delivers responses to calls and/or electronic mail addressed by an originating A-subscriber to the B-subscriber, in accordance with and using information stored in predetermined fields of the calendar database of the B-subscriber.

15 Claims, 1 Drawing Sheet

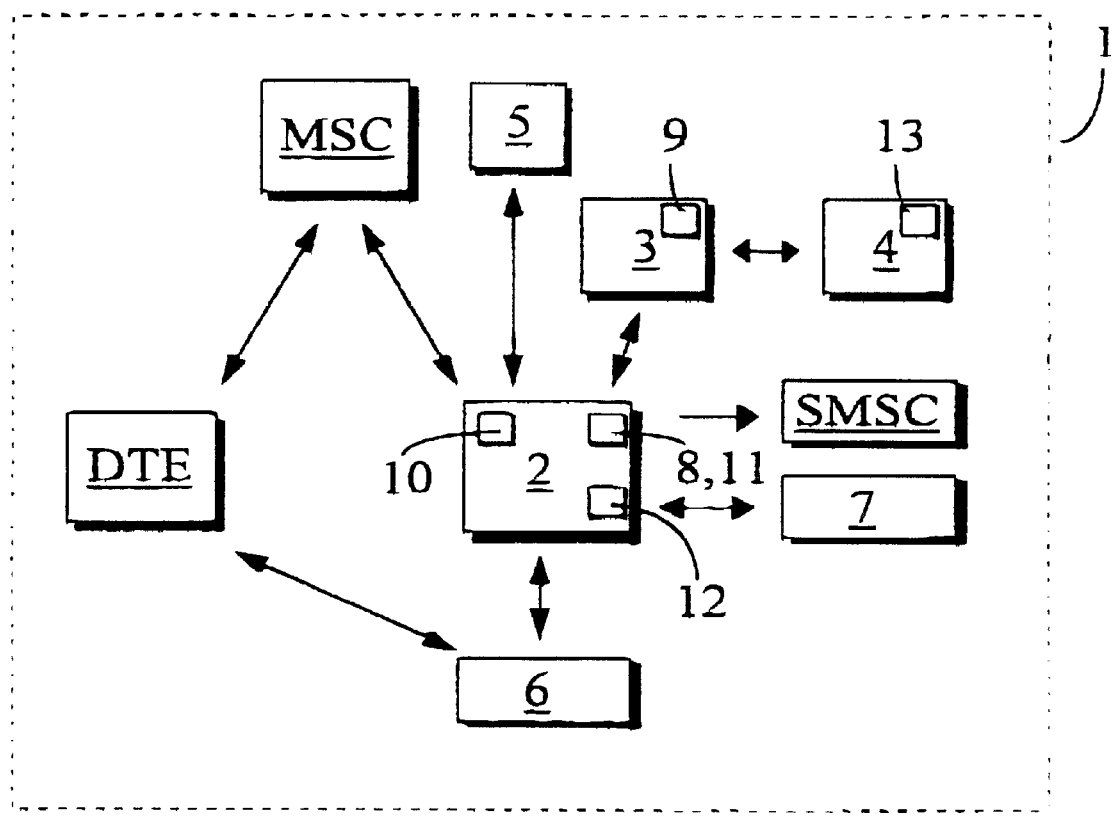

SYSTEM AND METHOD FOR IMPLEMENTING AN AUTOMATED COMMUNICATION RESPONSE SERVICE

BACKGROUND OF THE INVENTION

1. Field of the Invention

The present invention relates to automated response and answering service and functionality in voice and data communications systems, and is more particularly directed to a method and system for implementing an automated response to an incoming communication based on information stored in an electronic calendar database of the intended recipient of the communication.

2. Description of Related Art

At present, when a subscriber to a voice or data communication or telecommunication system cannot be reached by telephone or electronic mail, calls or mail to the subscriber are commonly answered or received by a secretary or assistant who may be specially hired to do that job. In such situations, when the originator of a voice call or electronic mail (referred to herein as the A-subscriber) is attempting to reach an intended recipient (referred to herein as the B-subscriber), the secretary or assistant normally informs the A-subscriber of the unavailability of the B-subscriber and either asks that the A-subscriber call again or accepts a message for his or her employer. In other cases or situations, B-subscribers utilize automated telephone answering or answer-back machines or devices, or contract with answering services, for accepting and storing short messages from callers.

It is also possible in the telephone network to send electronic mail (i.e. e-mail) messages based on the TCP/IP protocol. Some mobile communication systems similarly permit the subscriber to send and receive short messages in text form.

Employing human labor to attend to the receipt of voice calls and electronic mail is, however, expensive and an unproductive use of often-limited resources. A secretary or assistant is also limited by his or her personal abilities, is prone to human error, and is typically only available during specific working hours. Moreover, the transmission of speech in a telecommunication network requires a significant usage of network capacity, and such networks are further burdened by useless or unsuccessful communication attempts.

An additional problem encountered in the use of secretarial services and automated telephone answering devices as heretofore known is that particular callers cannot be individuated or sorted out but, rather, each caller is given the same preset information. It is likewise not possible to readily define an automated, sender-specific response to incoming electronic mail messages.

Also in heretofore-known methods, communication with foreign parties is restricted by language problems, in that the caller or mail sender may not necessarily speak or understand the same language as the secretary or that is used in the outgoing message of the automated answering or answer-back device.

SUMMARY OF THE INVENTION

It is accordingly the desideratum of the present invention to eliminate, or at least significantly reduce, the drawbacks and deficiencies of the prior art, as for example described hereinabove.

It is a particular object of the invention to provide a method and system for implementing a short message or electronic mail automated answering or response service in which the response is based on calendar information of the B-subscriber in a voice or data telecommunication system.

It is a further object of the invention to provide such a method and system in which the automated answer or response is generated using information specified by the B-subscriber for the particular calling or sending A-subscriber identified in accordance with the invention.

A system in accordance with the present invention for implementing an automated answering or response service in a telecommunication network includes a short-message service center (SMSC) for receiving, storing and sending a short message, an electronic mail service base for receiving, storing and sending an electronic mail message, a mobile services switching center (MSC), and data terminal equipment (DTE). In addition, an answering server provides means, which may be implemented in any suitable manner known or available to the person of skill, and preferably via software, for generating and transmitting an automatic short answering message or electronic mail response from or using a calendar database of the B-subscriber when the A-subscriber cannot reach the B-subscriber by telephone or via electronic mail.

In an embodiment of the system, the calendar database contains calendar information relating to the B-subscriber, stored in different fields and sorted by content. Thus, different fields may contain items of information such, for example, as the B-subscriber's name, the point in time, the B-subscriber's whereabouts, a person acting as a substitute or alternate contact for the B-subscriber, and free space for other items or messages. If necessary or desired, the calendar database may also include a field storing a reminder message to be sent to the B-subscriber concerning an event specified as being of essential importance or high priority.

The calendar database may furthermore comprises means for updating the stored information from an electronic calendar used and/or maintained by the B-subscriber. Such updating means can be implemented in any suitable manner known or available to the person of skill, such as through the use of electronics or, as is preferred, in software.

In certain embodiments, the answering server may comprise means for identifying the A-subscriber based on the A-subscriber's originating telephone number or electronic mail address. The answering server may further include means for generating, from predetermined fields of the B-subscriber's calendar database, an automated response that has been specially set or provided or defined by the B-subscriber for the particular A-subscriber identified as the originator of the incoming call or e-mail message. The A-subscriber generating means and the automated response generating means may be implemented in any suitable manner known or available to the person of skill, such as through the use of electronics or, as is preferred, in software. The answering server may additionally include or utilize or effect a connection from the answering server to a user database for use in operatively identifying the B-subscriber to identify the correct calendar database to be employed or accessed to provide the information for an automated response to the identified A-subscriber. The answering server may still further comprise means for connecting the incoming call to a telephone answer-back machine or service. These additional means may likewise be implemented in any manner known or available to the person of skill, such as through the use of electronics or, as is preferred, in software. The incoming call will, of course, be transferred to a telephone answer-back device only if the B-subscriber has activated this service or functionality for the particular A-subscriber identified as the source of the incoming call or message.

Particular embodiments of the inventive system may include means for maintaining and changing the information contained in the B-subscriber's electronic calendar or calendar database from the subscriber's own terminal equipment, from or over the Internet, or from a separate (i.e. independent or different) information or communication system. Such means may also be implemented in any way known or available to the person of skill, preferably in or via software.

In the inventive methods for implementing an automated answering service in a telecommunication network that includes, or is associated with, a short-message service center (SMSC) for receiving, storing and sending a short message, an electronic mail service base for receiving, storing and sending an electronic mail message, a mobile services switching center (MSC), and data terminal equipment (DTE), when a B-subscriber cannot be reached an answering server automatically answers and responds to calls and/or electronic mail messages directed or addressed to the B-subscriber by an A-subscriber, in accordance with the information stored in predetermined database fields of the calendar database of the B-subscriber. Items of calendar information relating to the B-subscriber and used for generating the automated response may be stored in different fields in the calendar database and sorted by the content of the stored information.

The calendar database may be updated with newly-stored information from an electronic calendar used by the B-subscriber.

In certain embodiments of the inventive method, the answering server identifies the particular A-subscriber by the call or message-originating telephone number and/or electronic mail address. The answering server automatically generates an answer to the A-subscriber's call or message from or using the information stored in predetermined calendar database fields by the B-subscriber for the particular, identified A-subscriber. The answering server may additionally identify the B-subscriber from a user database in order to find and utilize the correct calendar database to generate the automated response.

In accordance with the inventive method, the answering server may activate or initiate or effect a connection to a telephone answering or answer-back device or service when a caller attempts to reach the B-subscriber by telephone and the B-subscriber has activated this functionality for the particular A-subscriber identified as having originated the call.

The B-subscriber may use or access his or her electronic calendar from the B-subscriber's own terminal equipment, from or via the Internet, or from a separate information or communication system.

As compared with prior art methods and systems, the present invention advantageously provides an inexpensive, reliable and fast method of implementing an automated accessibility service for all parties. For a B-subscriber, the method is significantly less costly than a personal secretary, and the service is active at all times of the day and night. The B-subscriber can furthermore combine all of his or her calendar services in a single service. Information stored in the B-subscriber's calendar database is safely preserved, even if the electronic calendar used by the B-subscriber should be destroyed or lost. In addition, the calendar database can be viewed or regarded as a backup for the electronic calendar. Thus if, for example, the electronic calendar were to be destroyed, the calendar data can be retrieved from the calendar database and delivered or fed into a functional replacement electronic calendar. In addition, the invention makes it possible to combine an interpretative service with the inventive automated answering functionality, thus allowing calls or messages received from abroad to be answered in the language of the A-subscriber.

The invention permits considerable savings in network capacity to be achieved because responsive messages are transmitted in the form of compact data packets instead of circuit-switched speech requiring substantial bandwidth and network capacity. Useless communication attempts by the A-subscriber are also avoided, saving both network capacity and the A-subscriber's time.

A still further advantage of the invention, as compared with the prior art, is the significant ease of use of the inventive method and system.

Other objects and features of the present invention will become apparent from the following detailed description considered in conjunction with the accompanying drawing. It is to be understood, however, that the drawing is designed solely for purposes of illustration and not as a definition of the limits of the invention, for which reference should be made to the appended claims.

BRIEF DESCRIPTION OF THE DRAWING

The single drawing FIGURE presents a block diagram of a particular embodiment of an automated communication response system in accordance with the invention.

DETAILED DESCRIPTION OF THE CURRENTLY PREFERRED EMBODIMENTS

The system illustrated in FIG. 1 comprises a telecommunication network 1 that includes a mobile services switching center MSC, a short-message service center SMSC for the reception, delivery and storage of short messages, and an electronic mail service base 6 for the reception, delivery and storage of electronic mail messages. The system additionally includes an answering server 2, which comprises means 8 and 11 for generating and transmitting from the calendar database 3 of the B-subscriber an automated response to a short message or electronic mail message, the response being individualized for the particular A-subscriber denoted by the detected A-subscriber identifier. The calendar database 3 comprises means 9 for updating of the calendar database with information from the B-subscriber's electronic calendar 4, and the calendar 4 comprises means 13 for maintaining information relating to the B-subscriber and entered into the calendar 4 from the B-subscriber's data terminal equipment DTE, from or via the Internet, or from some other, separate information or communication system (not shown). In the example herein described, the means 9 and 13 are preferably implemented via or using software.

The answering server 2 additionally includes means 10 for identifying the A-subscriber i.e.—for determining the incoming caller's A-subscriber identifier—on the basis of the originating telephone number and/or electronic mail address, and means 12 for connecting the incoming call to a telephone answering server 7. In the particular example under discussion, each of the means 8, 10, 11 and 12 are preferably implemented via or using software.

In order to identify the B-subscriber, and to thereby access and utilize information stored in the correct calendar database (i.e. of that particular B-subscriber), a user database 5 is utilized and consulted.

The system 1 additionally includes data terminal equipment DTE, for example of the B-subscriber, which may comprise a telephone set or equipment and/or a computer terminal connected to a TCP/IP (Transmission Control Protocol/Internet Protocol) network. The telephone answering server 7 is operable for implementing a telephone answer-back or answering device or service.

In the embodiment shown in the drawing FIGURE, the B-subscriber maintains his or her calendar database 3, as for example by filling his or her electronic calendar 4 with desired information from the B-subscriber's data terminal equipment DTE, which preferably comprises a fixed base or mobile station or computer. The electronic calendar 4 may be implemented in, by way of illustrative and nonlimiting example, the Internet, a mobile station, or a separate database.

In the FIGURE-disclosed embodiment, the data terminal equipment of the A-subscriber is a mobile station. The A-subscriber calls the telephone number of the B-subscriber from the A-subscriber's mobile station and the call is transferred to the answering server 2 in a manner defined by the B-subscriber.

The B-subscriber may for example store a setting in the answering server 2 to indicate whether calls from certain originating telephone numbers are to be connected to another number or to the subscriber's own terminal equipment, or whether each call is to be answered with a short message response. The answering server 2 identifies the B-subscriber from the user database 5, and then uses the information stored in the B-subscriber's calendar database 3 to generate a short message response to the A-subscriber. The information in the calendar database 3 has (in preferred forms of the invention) been sorted into a plurality of fields, each containing preferably different information about the B-subscriber with respect to the B-subscriber's schedule, appointments, substitute contacts, etc. The B-subscriber can also enter in the answering server 2 rules or definitions specifying which A-subscriber identifiers are to be answered with information from which fields in the calendar database 3. If necessary or desired, the calendar database 3 may also include one or more fields to store reminder messages, for predetermined delivery to the B-subscriber or to particular other A-subscriber callers, in respect of events considered to be essential or of high priority.

In the particular embodiment herein described by way of illustrative example, the A-subscriber identifier is the telephone number 1234 of the originating A-subscriber's mobile station. For this particular identifier (i.e. A-subscriber), the B-subscriber has defined a short message in text form to be automatically sent to the A-subscriber, such as "I am in London. In urgent business matters, contact me at number 2345". For an A-subscriber calling from another number, the message generated and sent by the answering server 2 may on the other hand be "I am at a conference. Contact me again tomorrow." The B-subscriber can also simultaneously use or specify a telephone answering or answer-back device or service, in which case an A-subscriber for whose identifier this particular functionality has been activated is first connected to the telephone answer-back server 7, whereupon he or she then receives the appropriate information or instructions from the answering server 2 in accordance with the foregoing.

Where the incoming communication is determined to originate from an A-subscriber identifier for which no special message has been specified or stored, a default or other message can be generated using, for example, only the first (or other designated) field(s) in the calendar database 3.

In this same example, the A-subscriber might of course have instead used a personal computer or the like as the data terminal equipment from which the incoming communication originated, in which case the communication may have been an electronic mail message sent over the Internet to the B-subscriber. The inventive system would in such cases then have generated and transmitted an automated response, as explained hereinabove, but by electronic mail. In such situations, the A- and B-subscribers are identified on the basis of their electronic mail addresses.

As will be appreciated, there is always a possibility that the electronic calendar 4 used by the B-subscriber is unintendedly destroyed or corrupted or otherwise lost or rendered inaccessible. In such situations the B-subscriber can simply copy his or her data from the calendar database 3 to a new or restored electronic calendar 4 without loss of data or data integrity.

Thus, while there have shown and described and pointed out fundamental novel features of the invention as applied to preferred embodiments thereof, it will be understood that various omissions and substitutions and changes in the form and details of the methods described and devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A system for implementing an automated response service in a telecommunication network that includes a short-message service center for receiving, storing and sending a short message, an electronic mail service base for receiving, storing and sending an electronic mail message, a mobile services switching center, and data terminal equipment of an intended recipient B-subscriber to whom a communication comprising one of a phone call and an electronic mail message is directed through the telecommunication network from an originating A-subscriber, wherein the B-subscriber has an electronic calendar containing stored information, the improvement comprising:

a calendar database containing the stored information of the electronic calendar of the B-subscriber; and an answering server comprising means for generating a response to the communication from predetermined fields of the calendar database, the predetermined fields being selected by the B-subscriber for use in generating the response to the originating A-subscriber, and for automatically transmitting the generated response to the A-subscriber, when the intended B-subscriber recipient cannot be reached by the communication from the A-subscriber.

2. A system in accordance with claim 1, wherein said calendar database contains calendar information relating to the B-subscriber, the calendar information being stored in the calendar database in the fields and sorted by content of the field-stored information.

3. A system in accordance with claim 1, wherein the calendar database comprises means for updating the field-stored information with newly-stored information of the electronic calendar of the B-subscriber.

4. A system in accordance with claim 1, wherein said answering server comprises means for identifying the originating A-subscriber based on one of a telephone number and an electronic mail address of the A-subscriber.

5. A system in accordance with claim 1, said answering server further comprising means for effecting a connection to a user database of the telecommunication system for identifying the B-subscriber to thereby enable locating of correct information for use in generating the response to the A-subscriber using the calendar database of the B-subscriber.

6. A system in accordance with claim 1, said answering server further comprising means for connecting the communication from the originating A-subscriber to a telephone answer-back service where the B-subscriber has activated answer-back service functionality for the A-subscriber.

7. A system in accordance with claim 1, further comprising means for maintaining and changing the information stored in the electronic calendar of the B-subscriber based on input received from one of the data terminal equipment of the B-subscriber, an internet connection and a separate information system.

8. A method for implementing an automated response service in a telecommunication network that includes a short-message service center for receiving, storing and sending a short message, an electronic mail service base for receiving, storing and sending an electronic mail message, a mobile services switching center, and data terminal equipment of an intended recipient B-subscriber to whom a communication comprising one of a phone call and an electronic mail message is directed through the telecommunication network from an originating A-subscriber, wherein the B-subscriber has an electronic calendar containing stored information, said method comprising the steps of:

automatically generating, at an answering server of the telecommunication system when the intended B-subscriber recipient cannot be reached by the communication from the A-subscriber, a response to the communication from the A-subscriber from predetermined fields of a calendar database that stores information from the electronic calendar of the B-subscriber, the predetermined fields being selected by the B-subscriber for use in generating the response to the originating A-subscriber; and automatically transmitting to the A-subscriber the generated response from the answering server.

9. A method in accordance with claim 8, further comprising the step of:

selecting, by the B-subscriber, the predetermined fields of the calendar database to be used by the answering server to generate the response to the communication from the A-subscriber using the information stored in the predetermined fields.

10. A method in accordance with claim 8, wherein the calendar database contains calendar information relating to the B-subscriber, the calendar information being stored in the calendar database in the fields and sorted by content of the field-stored information.

11. A method in accordance with claim 8, further comprising the step of:

updating the field-stored information in the calendar database with newly-stored information of the electronic calendar of the B-subscriber.

12. A method in accordance with claim 8, further comprising the step of:

identifying, at the answering server, the originating A-subscriber based on one of a telephone number and an electronic mail address of the A-subscriber from whom the communication originates.

13. A method in accordance with claim 8, further comprising the step of:

identifying the B-subscriber from a user database to thereby enable locating of correct information for use in generating the response to the A-subscriber using the calendar database of the B-subscriber.

14. A method in accordance with claim 8, further comprising the step of:

connecting, from the answering server, the communication from the *originating A-subscriber to a telephone answer-back service where the B-subscriber has activated answer-back service functionality for the A-subscriber.

15. A method in accordance with claim 8, further comprising the step of:

accessing, by the B-subscriber, the electronic calendar of the B-subscriber from one of the data terminal equipment of the B-subscriber, an internet connection and a separate information system.

* * * * *